(12) United States Patent
Kobayashi et al.

(10) Patent No.: US 6,403,842 B1
(45) Date of Patent: Jun. 11, 2002

(54) PROCESSES FOR PRODUCING POLY (ALKYLENE ETHER) GLYCOL

(75) Inventors: Mitsuharu Kobayashi, Kanagawa; Nobuyuki Murai, Mie, both of (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/482,641

(22) Filed: Jan. 13, 2000

(30) Foreign Application Priority Data

Jan. 14, 1999 (JP) .......................................... 11-007244

(51) Int. Cl.$^7$ ........................ C07C 43/13; C07C 41/01; C07C 41/02; C07C 41/34
(52) U.S. Cl. ........................ 568/617; 528/365; 528/366; 528/405; 528/408; 528/409; 528/410; 528/411; 528/416; 528/417; 528/421; 560/240; 568/613; 568/621; 568/623; 568/624
(58) Field of Search ........................ 560/240; 568/613, 568/617–623, 624, 621; 528/365, 366, 408, 405, 410, 409, 411, 416, 417, 421

(56) References Cited

U.S. PATENT DOCUMENTS

| | | | | |
|---|---|---|---|---|
| 4,189,566 A | * | 2/1980 | Mueller et al. | 528/408 |
| 4,243,799 A | * | 1/1981 | Mueller et al. | 528/409 |
| 4,259,531 A | * | 3/1981 | Huchler et al. | 568/617 |
| 4,803,299 A | | 2/1989 | Mueller | 560/240 |
| 5,362,365 A | * | 11/1994 | Niijima et al. | 203/31 |
| 5,463,020 A | * | 10/1995 | Becker et al. | 528/408 |
| 5,648,558 A | | 7/1997 | Hatano et al. | 568/618 |
| 5,684,179 A | | 11/1997 | Dorai | 560/191 |

FOREIGN PATENT DOCUMENTS

| | | |
|---|---|---|
| DE | 2801792 | 7/1979 |
| JP | 45-22341 | 7/1970 |
| WO | WO 9831724 | 7/1998 |

OTHER PUBLICATIONS

Heimo Held, et al., Acetic Anhydride and mixed Fatty acid Anhydrides:, Ullmann's Encyclopedia of Industrial Chemistry, VCH Verlag, Weinheim, DE XP002169404, pp. 65–78, Dec., 1984.

* cited by examiner

Primary Examiner—Rabon Sergent
(74) Attorney, Agent, or Firm—Oblon, Spivak, McClelland, Maier & Neustadt, P.C.

(57) ABSTRACT

Disclosed are a process for producing a poly(alkylene ether) glycol which comprises polymerizing a cyclic ether in the presence of at least a catalyst and a carboxylic acid anhydride, wherein the carboxylic acid anhydride has a ketene dimer content of 50 ppm or lower, and a process for producing a poly(alkylene ether) glycol which comprises polymerizing a cyclic ether in the presence of at least a catalyst and acetic anhydride, wherein the acetic anhydride is purified acetic anhydride obtained by treating acetic anhydride by contacting with at least one of a metal oxide and a mixed oxide, and optionally, distilling the acetic anhydride simultaneously with or after the contact treatment.

13 Claims, No Drawings

PROCESSES FOR PRODUCING POLY(ALKYLENE ETHER) GLYCOL

FIELD OF THE INVENTION

The present invention relates to processes for producing a poly(alkylene ether) glycol by polymerizing a cyclic ether. More particularly, the invention relates to processes for producing a less colored poly(alkylene ether) glycol. The poly(alkylene ether) glycol is used as a raw material for urethane elastic materials and thermoplastic elastic materials.

DESCRIPTION OF THE RELATED ART

A known process for producing a poly(alkylene ether) glycol comprises subjecting a cyclic ether to ring-opening polymerization using a solid acid catalyst and acetic anhydride as an initiator and then subjecting the polymer to hydrolysis or transesterification (see, for example, JP-B-62-19452 and JP-A-8-231706). (The terms "JP-B" and "JP-A" as used herein mean an "examined Japanese patent publication" and an "unexamined published Japanese patent application", respectively.)

However, this process has a drawback that the reactions yield a colored poly(alkylene ether) glycol when conducted over a prolonged time period.

SUMMARY OF THE INVENTION

An object of the invention is to provide a process for producing a poly(alkylene ether) glycol which comprises subjecting a cyclic ether to ring-opening polymerization using a solid acid catalyst and a carboxylic acid anhydride as an initiator and in which the coloration of the poly(alkylene ether) glycol being yielded is inhibited.

The present inventors made intensive investigations in order to eliminate the problem described above. As a result, they have found that the coloration can be inhibited to produce a poly(alkylene ether) glycol having an excellent hue by reducing the ketene dimer content of the carboxylic acid anhydride for use in the reaction. They have further found that the ketene dimer can be considerably diminished by treating the carboxylic acid anhydride by contacting with a specific treating agent. The invention has been achieved based on these findings.

The invention provides, according to a first aspect thereof, a process for producing a poly(alkylene ether) glycol which comprises polymerizing a cyclic ether in the presence of at least a catalyst and a carboxylic acid anhydride, wherein the carboxylic acid anhydride has a ketene dimer content of 50 ppm or lower.

The invention further provides, according to a second aspect thereof, a process for producing a poly(alkylene ether) glycol which comprises polymerizing a cyclic ether in the presence of at least a catalyst and a carboxylic acid anhydride, wherein the carboxylic acid anhydride is one which has been treated by contacting with a metal oxide and/or a mixed oxide.

The invention furthermore provides, according to a third aspect thereof: a process for producing a urethane polymer obtained by reacting the poly(alkylene ether) glycol obtained by either of the processes described above with an organic polyisocyanate compound; and an elastic fiber comprising the urethane polymer.

The invention still further provides, according to a fourth aspect thereof, a poly(alkylene ether) glycol which is obtained by polymerizing a cyclic ether in the presence of at least a catalyst and a carboxylic acid anhydride and has a hue of below 20 in terms of APHA unit.

DESCRIPTION OF THE PREFERRED EMBODIMENTS

The invention will be explained below in detail with respect to embodiments thereof.

The cyclic ether for use in the invention generally is a cyclic ether having 2 to 10 carbon atoms. Examples thereof include ethylene oxide, propylene oxide, tetrahydrofuran (THF), 1,4-dioxane, tetrahydropyran, and oxetane. Especially preferred of these is THF from the standpoints of availability and handleability.

The carboxylic acid anhydride used as a polymerization initiator is not particularly limited. However, acetic anhydride is generally used from the standpoint of industrial availability.

In general, in the synthesis or decomposition of a carboxylic acid anhydride, e.g., acetic anhydride, a ketene generates in a slight amount and dimerizes to form a ketene dimer.

Known processes for industrially producing a carboxylic acid anhydride, e.g., acetic anhydride, include the following: i) a process comprising pyrolyzing the vapor of acetic acid, acetone, or an acetic ester to yield a ketene gas and causing the ketene to be absorbed by and react with acetic acid; (ii) a process comprising reacting acetic acid with phosgene using anhydrous aluminum chloride or the like as a catalyst; and (iii) a process comprising heating ethylidene diacetate in the presence of a catalyst, e.g., zinc chloride.

These processes each yields a ketene dimer as a by-product. Since the difference in boiling point between acetic anhydride and the ketene dimer is small, acetic anhydride of the industrial grade (hereinafter sometimes referred to as "crude acetic anhydride") contains the ketene dimer generally in an amount of about 100 ppm. In addition, the carboxylic acid anhydride partly decomposes into the carboxylic acid and a ketene due to thermal equilibrium and this ketene dimerizes to yield a ketene dimer.

It is important that the carboxylic acid anhydride for use in the invention should be regulated so as to have a ketene dimer concentration of generally 50 ppm or lower, preferably 10 ppm or lower, more preferably 5 ppm or lower. In this specification, the values of ketene dimer concentration are by weight.

Methods for reducing the ketene dimer content in the carboxylic acid anhydride to 50 ppm or lower are not particularly limited. Examples thereof include precision distillation, treatment with an ion-exchange resin, treatment with a metal oxide, and treatment with a mixed oxide. These methods may be used in combination of two or more thereof. Preferred of these is treatment with an ion-exchange resin, treatment with a metal oxide, treatment with a mixed oxide, or a combination of two or more thereof.

The metal oxide is not particularly limited. Preferred examples thereof include aluminum oxides such as γ-alumina, zirconium oxide, titanium oxide, niobium oxide, and tantalum oxide.

The mixed oxide may be a crystalline or amorphous compound. Examples thereof include zeolites, activated clays, and mixed oxides each comprising an oxide of two or more elements selected from the elements in Groups 3, 4, 13, and 14 and having an acid strength of +3.0 or lower in terms of $H_O$.

The zeolites are not particularly limited. Preferred examples thereof include crystalline aluminosilicates such as the ZSM-5, β, Y, MCM-22, mordenite, and ZSM-12 types. Also usable are crystalline metallosilicates formed by replacing the aluminum of such crystalline aluminosilicates with another trivalent metal element.

Examples of the mixed oxides each comprising an oxide of two or more elements selected from the elements in Groups 3, 4, 13, and 14 and having an acid strength of +3.0 or lower in terms of $H_O$ include zirconia-silica, hafnia-silica, silica-alumina, titania-silica, and titania-zirconia.

Methods for the contact treatment of the carboxylic acid anhydride with a metal oxide and/or a mixed oxide are not particularly limited, and the treatment may be conducted by either the suspension or fixed bed method. In the case where the contact treatment is conducted batchwise, the treatment may be accomplished by merely immersing the metal oxide and/or mixed oxide in crude acetic anhydride.

The amount of the metal oxide and/or mixed oxide used in the contact treatment varies depending on the method of contact, and need not be especially specified. However, in the case of, for example, mere immersion in crude acetic anhydride by a batch method, the amount of the metal oxide and/or mixed oxide is generally about from 0.1 to 5 parts by weight per 100 parts by weight of the crude acetic anhydride.

The shape of the metal oxide and/or mixed oxide is not particularly limited, and may be either powdery or particulate. Although the specific surface area thereof is not particularly limited, it is generally selected from the range of from 10 to 1,000 $m^2/g$.

The time for the contact treatment varies depending on the method of contact and the purity of the crude acetic anhydride to be treated. However, it is generally about from 0.1 to 100 hours. In the case of a continuous method, the time for contact treatment means average residence time.

The temperature for the contact treatment is not particularly limited, and the treatment is generally conducted in the range of about from room temperature to the boiling point of acetic anhydride, i.e., about 140° C.

Distillation treatment (hereinafter sometimes referred to simply as distillation) can be conducted in combination with the contact treatment described above. The distillation may be conducted either while keeping the carboxylic acid anhydride in contact with the metal oxide and/or complex oxide or after the metal oxide and/or complex oxide has been separated from the acid anhydride. This distillation may be precision distillation or simple distillation with, e.g., a distilling tank. Although the distillation maybe conducted at atmospheric or a reduced pressure, it is preferred to use a reduced pressure.

By the method described above, a carboxylic acid anhydride having a ketene dimer concentration reduced to 50 ppm or lower is obtained.

In the processes for poly(alkylene ether) glycol production of the invention, the use amount of the carboxylic acid anhydride is generally from 0.1 to 100 mol, preferably from 1 to 30 mol, per 100 mol of the cyclic ether.

From the standpoint of catalyst life, the carboxylic acid anhydride is preferably used in combination with the corresponding carboxylic acid. The use amount of this carboxylic acid is generally from 0.1 to 10 mol per 100 mol of the carboxylic acid anhydride.

The catalyst used in the processes of the invention is usually a solid acid catalyst comprising a metal oxide. Examples of this solid acid catalyst include oxides of metals in Groups 3, 4, 13, and 14 and mixed oxides containing a metallic element in Group 3, 4, 13, or 14. Specific examples thereof include metal oxides such as yttrium oxide, titania, zirconia, alumina, and silica and mixed oxides such as zirconia-silica, hafnia-silica, silica-alumina, titania-silica, and titania-zirconia. Also usable are these mixed oxides which further contain other metallic elements.

The use amount of the catalyst varies depending on whether the reaction is carried out by the fixed bed or suspension method or whether the reaction is conducted continuously or batchwise. In the case where the reaction is conducted continuously by the suspension method, the catalyst amount is in the range of generally from 0.1 to 100 parts by weight, preferably from 1 to 50 parts by weight, per 100 parts by weight of the feed liquid amount per hour.

Although the reaction in the processes of the invention is generally conducted in the absence of a solvent, it may be conducted using a solvent. In the case of using a solvent, however, care should be taken to prevent the solvent from bringing a ketene dimer into the reaction system.

The reaction is preferably carried out in a liquid phase using a solid catalyst, and may be conducted continuously or batchwise. Although the catalyst in the continuous reaction may be used as a fixed bed or in a suspended state, it is preferably used in a suspended state for the continuous reaction from the standpoint of production cost. In the case where the reaction is conducted continuously, it is preferred to recycle the unreacted reaction mixture to the polymerization zone.

In the case where the continuous reaction is conducted while recycling the carboxylic acid anhydride to the polymerization zone, the amount of the ketene dimer is regulated to 50 ppm or smaller based on the total amount of the freshly fed carboxylic acid anhydride and the recycled carboxylic acid anhydride. More preferably, the freshly fed carboxylic acid anhydride and the recycled carboxylic acid anhydride each is regulated so as to have a ketene dimer concentration of 50 ppm or lower.

The reaction temperature is not particularly limited as long as a liquid phase can be maintained. However, it is generally from b 0to 200° C., preferably from 10 to 80° C., more preferably from 20 to 60° C.

The reaction pressure is generally from atmospheric pressure to 10 MPa, preferably from atmospheric pressure to 5 MPa.

The reaction time is not particularly limited. However, it is preferably from 0.1 to 20 hours, more preferably from 0.5 to 15 hours. The term reaction time means average residence time when the reaction is conducted continuously.

The poly(alkylene ether) glycol diester thus obtained is subjected to hydrolysis or transesterification by an ordinarily used known method, whereby a poly(alkylene ether) glycol can be produced.

The molecular weight of the polymer obtained by the processes of the invention varies depending of the kind of the cyclic ether. However, in the case where THF is used as a raw material to produce poly(tetramethylene ether) glycol, the number-average molecular weight ($M_n$) of this polymer is generally from 500 to 50,000, preferably from 1,000 to 20,000 and the ratio of the weight-average molecular weight thereof to the number average molecular weight thereof ($M_w/M_n$) is generally in the range of from 1.0 to 3.0.

The hue of the poly(tetramethylene ether) glycol obtained by the processes of the invention is below 20, preferably 10 or lower, in terms of APHA unit (see JIS K 1557-1970, which corresponds to ASTM D-1209).

A urethane polymer can be produced by reacting the poly(alkylene ether) glycol obtained by the processes of the invention with an organic polyisocyanate compound. The urethane polymer can be used as an elastic fiber, foam, elastomer, or the like.

The isocyanate compound for use in the urethane polymer production may be a known isocyanate compound. Examples thereof include aromatic isocyanates such as tolylenediisocyanate, diphenylmethanediisocyanate, and 1,5-naphthylenediisocyanate. For producing the polymer, ordinarily used known methods may be employed. For example, the solution polymerization method may be used for producing elastic fibers (see "Kagaku Binran Oyokagaku Hen", edited by The Chemical Society of Japan, Maruzen Co., Ltd., pp. 605–606, published on Oct. 15, 1986).

EXAMPLES

The invention will be explained below in more detail by reference to Examples, but the invention should not be construed as being limited to the following Examples unless the invention departs from the spirit thereof.

Example 1

In 2,000 ml of industrial-grade acetic anhydride (ketene dimer content, about 100 ppm) was immersed 30 g of zirconia-silica (specific surface area, 200 m$^2$/g) for 24 hours. Subsequently, the zirconia-silica was removed by filtration, and the resultant filtrate was distilled at a reduced pressure of 100 Torr to obtain purified acetic anhydride.

The purified acetic anhydride had a ketene dimer content of 5 ppm or lower. This acetic anhydride was heated in a sealed glass tube at 160° C. for 2 hours. As a result, the acetic anhydride remained colorless.

Into a reactor for suspension type continuous polymerization having a capacity of 520 ml was introduced 10.4 g of a zirconia-silica catalyst. A feed material mixture composed of THF, the purified acetic anhydride, and acetic acid in a molar ratio of 100/8/0.46 was continuously fed thereto at a rate of 46 ml/hr to conduct continuous polymerization at a reaction temperature of 35° C.

At 260 hours after initiation of the reaction, the results of the reaction included an $M_n$ of 2,060, an $M_w/M_n$ of 2.05, and a THF conversion of 31%. Subsequently, sodium methoxide was used to conduct transesterification. Thus, poly(tetramethylene ether) glycol was obtained, which had a hue of 10 or lower in terms of APHA unit (see JIS K 1557-1970).

Example 2

Purification of acetic anhydride and continuous polymerization of THF were conducted in the same manner as in Example 1, except that zeolite β (manufactured by PQ Co., Si/Al$_2$=25; specific surface area, 500 m$^2$/g) was used in place of the zirconia-silica for the purification of industrial-grade acetic anhydride (ketene dimer content, about 100 ppm).

The purified acetic anhydride had a ketene dimer content of 5 ppm or lower, and remained colorless when heated in a sealed glass tube at 160° C. for 2 hours. The poly(tetramethylene ether) glycol obtained at 260 hours after initiation of the polymerization reaction had a hue of 10 or lower in terms of APHA unit.

Example 3

A jacketed fixed-bed column having a diameter of 1 inch was packed with 12 g of an activated clay (Tonsil Optimum FF, Sud-Chemie AG; molded with an extruder; specific surface area, 240 m$^2$/g). While 40° C. warm water was kept being circulated through the jacket, industrial-grade acetic anhydride (ketene dimer content, about 100 ppm) was fed to the fixed-bed column at a rate of 20 cc/hr. The treated liquid discharged from the column outlet was distilled at a reduced pressure of 100 Torr to obtain purified acetic anhydride.

This purified acetic anhydride had a ketene dimer content of 5 ppm or lower, and remained colorless when heated in a sealed glass tube at 160° C. for 2 hours. This acetic anhydride was used to conduct continuous polymerization of THF in the same manner as in Example 1. As a result, the poly(tetramethylene ether) glycol obtained at 260 hours after initiation of the reaction had a hue of 10 or lower in terms of APHA.

Comparative Example 1

Industrial-grade acetic anhydride (ketene dimer concentration, about 100 ppm) was heated in a sealed glass tube at 160° C. for 2 hours without being purified. As a result, the acetic anhydride slightly colored.

The unpurified industrial-grade acetic anhydride was used to conduct continuous polymerization of THF in the same manner as in Example 1. At 260 hours after initiation of the reaction, the results of the reaction included an $M_n$ of 2,110, an $M_w/M_n$ of 2.05, and a THF conversion of 28%. Subsequently, sodium methoxide was used to conduct transesterification. The poly(tetramethylene ether) glycol obtained had a hue of 40 in terms of APHA unit, showing that it had colored considerably.

As described above, according to the processes of the invention, poly(alkylene ether) glycol production can be conducted over a prolonged period of time while inhibiting coloration, whereby a poly(alkylene ether) glycol of satisfactory quality can be obtained.

What is claimed is:

1. A process for producing a poly(alkylene ether) glycol which comprises polymerizing a cyclic ether in the presence of at least a catalyst and a carboxylic acid anhydride, wherein the carboxylic acid anhydride has a ketene dimer content of 50 ppm by weight or lower.

2. The process of claim 1, wherein the carboxylic acid anhydride is acetic anhydride.

3. The process of claim 1, wherein the cyclic ether is tetrahydrofuran.

4. The process of claim 1, wherein the catalyst is a solid acid catalyst.

5. The process of claim 4, wherein the solid acid catalyst is a metal oxide.

6. The process of claim 5, wherein the metal oxide is an oxide of a metal in Group 3, 4, 13, or 14 of the Periodic Table, or a mixed oxide containing a metallic element in Group 3, 4, 13, or 14 of the Periodic Table.

7. The process of claim 1, wherein the carboxylic acid anhydride is prepared by a process comprising contacting a crude carboxylic acid anhydride with at least one oxide selected from the group consisting of a metal oxide, a mixed oxide, and mixtures thereof.

8. The process of claim 1, wherein the carboxylic acid anhydride is prepared by a process comprising contacting a crude carboxylic acid anhydride with at least one oxide selected from the group consisting of a metal oxide, a mixed oxide, and mixtures thereof and distilling the carboxylic acid anhydride simultaneously with or after the contacting.

9. The process of claim 7 or 8, wherein the carboxylic acid anhydride is acetic anhydride.

10. The process of claim 7 or 8, wherein the metal oxide is at least one oxide comprising a metallic element selected from Group 3, 4, 13 or 14 of the Periodic Table and the mixed oxide is at least one mixed oxide comprising a metallic element selected from Group 3, 4, 13 or 14 of the Periodic Table.

11. A process for producing a poly(alkylene ether) glycol which comprises polymerizing a cyclic ether in the presence of at least a catalyst and acetic anhydride, wherein the acetic anhydride is acetic anhydride having a ketene dimer content of 50 ppm by weight or less obtained by contacting crude acetic anhydride with at least one oxide selected from the group consisting of a metal oxide, a mixed oxide, and mixtures thereof.

12. A process for producing a poly(alkylene ether) glycol which comprises polymerizing a cyclic ether in the presence of at least a catalyst and acetic anhydride, wherein the acetic anhydride is acetic anhydride having a ketene dimer content of 50 ppm by weight or less obtained by contacting crude acetic anhydride with at least one oxide selected from the group consisting of a metal oxide, a mixed oxide, and mixtures thereof, and distilling the acetic anhydride simultaneously with or after the contacting.

13. A poly(alkylene ether) glycol prepared by the process of claim 1.

* * * * *